United States Patent
Bhayani

(10) Patent No.: US 8,446,912 B2
(45) Date of Patent: May 21, 2013

(54) MECHANISM FOR IMPLEMENTATION OF SYSTEM SIGNALING 7 (SS7) LAYERS AS MICROCONTAINER BEANS IN A MEDIA GATEWAY

(75) Inventor: Amit Bhayani, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 246 days.

(21) Appl. No.: 12/858,095

(22) Filed: Aug. 17, 2010

(65) Prior Publication Data

US 2012/0044945 A1    Feb. 23, 2012

(51) Int. Cl.
*H04L 12/56* (2006.01)

(52) U.S. Cl.
USPC .................. 370/401; 709/226; 709/203

(58) Field of Classification Search
USPC .................. 709/226, 203; 370/401
See application file for complete search history.

(56) References Cited

U.S. PATENT DOCUMENTS

| | | | |
|---|---|---|---|
| 2005/0100156 A1* | 5/2005 | Ashdown et al. | 379/221.08 |
| 2008/0235327 A1* | 9/2008 | Maes et al. | 709/203 |
| 2009/0080638 A1* | 3/2009 | Cleveland et al. | 379/221.08 |
| 2009/0132717 A1* | 5/2009 | Maes | 709/228 |
| 2011/0113140 A1* | 5/2011 | Bhayani | 709/226 |

* cited by examiner

*Primary Examiner* — Dang Ton
*Assistant Examiner* — Mewale Ambaye
(74) *Attorney, Agent, or Firm* — Lowenstein Sandler LLP

(57) ABSTRACT

A mechanism for implementation of system signaling 7 (SS7) layers as microcontainer beans in a media gateway is disclosed. A method of the invention includes implementing one or more System Signaling No. 7 (SS7) Message Transfer Part (MTP) layers as plain old JAVA objects (POJOs), associating each of the one or more SS7 MTP layers with JBoss Microcontainer Beans, and installing the one or more SS7 MTP layer Microcontainer Beans in a media gateway.

20 Claims, 5 Drawing Sheets

MECHANISM FOR IMPLEMENTATION OF SYSTEM SIGNALING 7 (SS7) LAYERS AS MICROCONTAINER BEANS IN A MEDIA GATEWAY

TECHNICAL FIELD

The embodiments of the invention relate generally to communication platforms and, more specifically, relate to a mechanism for implementation of system signaling 7 (SS7) layers microcontainer beans in a media gateway.

BACKGROUND

Common Channel Signaling System No. 7 (i.e., SS7 or C7) is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wired call setup, routing and control.

The SS7 protocol stack borrows partially from the Open Systems Interconnection (OSI) Model of a packetized digital protocol stack. OSI layers 1 to 3 are provided by the Message Transfer Part (MTP) and the Signaling Connection Control Part (SCCP) of the SS7 protocol (together referred to as the Network Service Part (NSP)). For circuit-related signaling, such as Telephone User Part (TUP) or ISDN User Part (ISUP), the User Part provides layer 7. Currently there are no protocol components that provide OSI layers 4 through 6. The Transaction Capabilities Application Part (TCAP) is the primary SCCP User in the Core Network and uses SCCP in connectionless mode. SCCP in connection-oriented mode provides the transport layer for air interface protocols such as BSSAP and RANAP. TCAP provides transaction capabilities to its Users (TC-Users), such as the Mobile Application Part, the Intelligent Network Application Part and the CAMEL Application Part. The Message Transfer Part (MTP) covers a portion of the functions of the OSI network layer including: network interface, information transfer, message handling and routing to the higher levels.

There are many switches/equipments/media gateways available today where MTP functionality is taken care of by hardware. But, with increased processing power and reduction in cost per CPU, the MTP layer can be implemented as software, thus greatly reducing the price for all SS7 solutions. There are also switches/media gateways available where MTP2 is software over SS7 hardware.

Furthermore, it is convenient to consider a media gateway as a collection of endpoints. An endpoint is a logical representation of a physical entity, such as an analog phone or a channel in a trunk. Endpoints are sources or sinks of data and can be physical or virtual. Physical endpoint creation requires hardware installation. An interface that terminates a trunk connected to a PSTN switch is an example of a physical endpoint. On the other hand, software is sufficient for creating a virtual endpoint. An audio source in an audio-content server is an example of a virtual endpoint.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
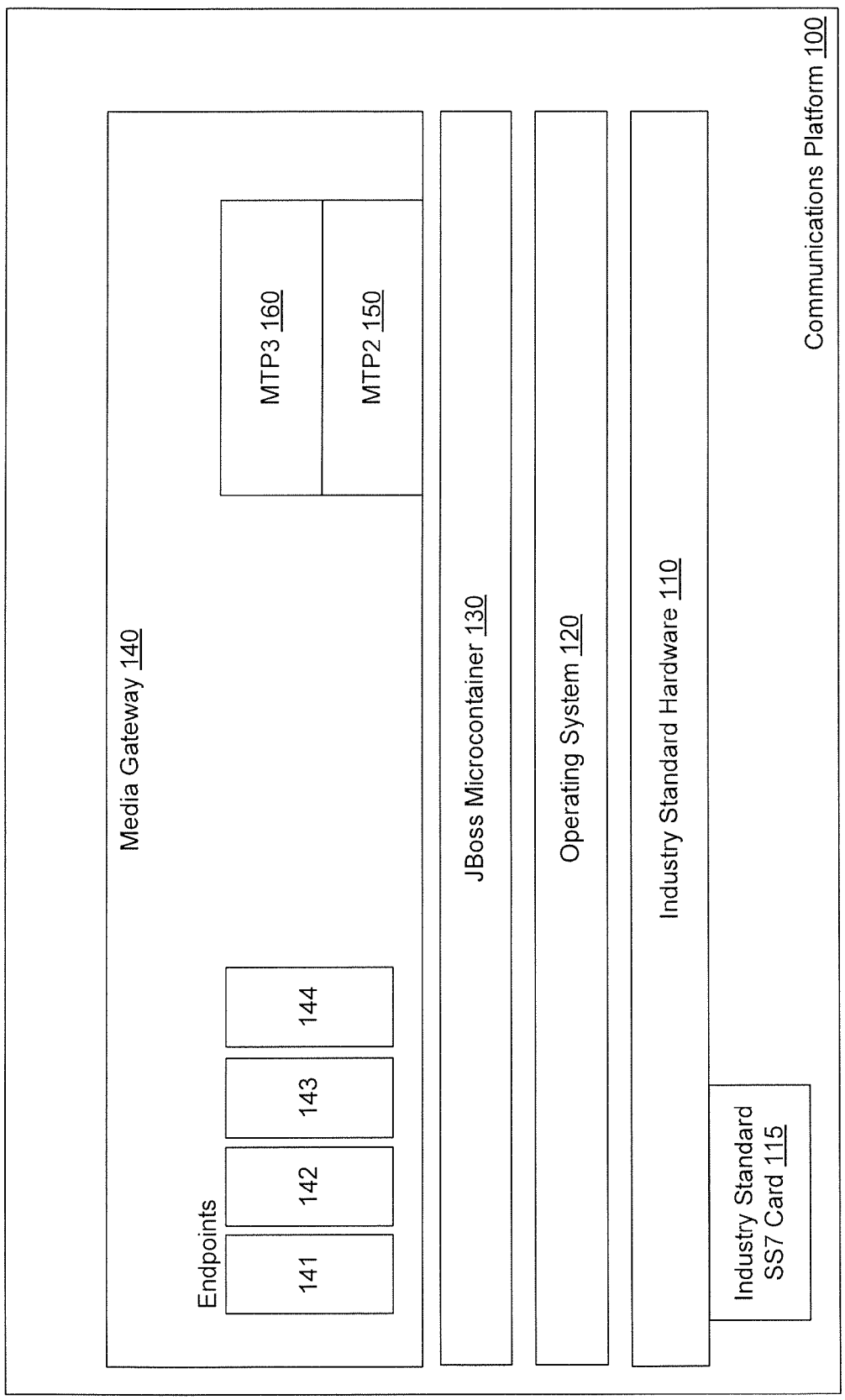
FIG. 1 is a block diagram depicting a communications platform according to an embodiment of the invention.

Embodiments of the invention provide a mechanism for implementation of system signaling 7 (SS7) layers as microcontainer beans in a media gateway. A method of embodiments of the invention includes implementing one or more System Signaling No. 7 (SS7) Message Transfer Part (MTP) layers as plain old JAVA objects (POJOs), associating each of the one or more SS7 MTP layers with JBoss Microcontainer Beans, and installing the one or more SS7 MTP layer Microcontainer Beans in a media gateway.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "implementing", "associating", "installing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for implementation of SS7 layers as JBoss Microcontainer beans in a media gateway. More specifically, embodiments of the invention provide for implementation of SS7 layers Message Transfer Part 2 (MTP2) and MTP3 as JBoss Microcontainer beans co-located in a same JAVA Virtual Machine (JVM) as physical and/or virtual endpoints also implemented as microcontainer beans.

FIG. 1 is a block diagram depicting a communications platform 100 according to an embodiment of the invention. Communication platform 100 is hosted by one or more computers, such as server computers. In one embodiment, communications platform may be based on a JAVA platform. The JAVA platform has traditionally been distributed in 3 editions, each providing a different type of runtime environment: Java ME (Micro Edition) for mobile or other embedded devices; Java SE (Standard Edition) for desktop machines or servers (typically running 2-tier applications); and Java EE (Enterprise Edition) for servers (typically running 3-tier applications). Each environment aims to provide a base level of functionality on top of which developers can add their own code to create applications. Services that are never used in the different runtime environments are undesirable as they can take up valuable resources such as CPU and memory resulting in lower performance. They may also clutter up the environment with redundant configuration files, complicating maintenance and adding unnecessary complexity. Given these drawbacks it would be better if there was a way to create a custom runtime environment containing only those services that were needed.

The JBoss Microcontainer aims to provide these capabilities by allowing services, created using Plain Old Java Objects (POJOs), to be deployed into a standard Java SE runtime environment in a controlled manner to create a customized environment for applications. The JBoss Microcontainer provides an environment to configure and manage POJOs (plain old java objects). It is designed to reproduce the existing JBoss JAVA Management Extensions (JMX) Microkernel, but targeted at POJO environments. As such, it can be used standalone outside a JBoss Application Server.

In one embodiment, the communications platform 100 is a single JVM. A JVM is a set of computer software programs and data structures that use a virtual machine model for the execution of other computer programs and servers. A JVM and its associated components may be implemented on one or more computing devices. In addition, a JVM functions seamlessly across a range of Internet Protocol (IP) and communications networks, and can be accessed by computers, handsets, and other network-enabled devices.

In embodiments of the invention, the communications platform 100 integrates a media gateway 140 on top of a JBoss Microcontainer 130, distributed by Red Hat®, Inc. of Raleigh, N.C. The integrated media gateway 140 and JBoss Microcontainer 130 enables the development, deployment, and management of applications that integrate voice, video, and data across a range of networks and devices. By utilizing a JBoss Microcontainer 130 environment with microcontainer beans, the media gateway 140 of embodiments of the invention may be easily adaptable to provide a variety of telecommunications services.

Communications platform 100 further includes third party industry standard hardware 110 and an operating system 120 operating on top of the hardware 110. The SS7 protocol requires special hardware called SS7 cards 115, that are basically PCI/PCE cards fitted in PCI/PCE slots of the third party industry standard hardware 110. In one embodiment, the operating system 120 may be a Linux operating system.

SS7 is a set of telephony signaling protocols which are used to set up most of the world's public switched telephone network telephone calls. The main purpose is to set up and tear down telephone calls. Other uses include number translation, prepaid billing mechanisms, short message service (SMS), and a variety of other mass market services. The MTP is a part of the SS7 used for communication in Public Switched Telephone Networks (PSTNs). MTP is responsible for reliable, unduplicated and in-sequence transport of SS7 messages between communication partners.

Embodiments of the invention implement endpoints and various layers of the SS7 protocol on the media gateway 140 as logically separate Microcontainer beans. More specifically, media gateway 140 may includes physical and virtual endpoints 141, 142, 143 and 144 deployed as JBoss Microcontainer Beans in the same JVM as SS7 lower layers MTP2 150 and MTP3 160. SS7 layers MTP2 150 and MTP3 160 are also deployed as JBoss Microcontainer Beans on top of the JBoss Microcontainer 130 according to an embodiment of the invention.

In one embodiment, endpoints 141-144 do not implement signaling logic, but rather are responsible for media generation and handling. The endpoints 141-144 provide voice and video interfaces for JAVA Enterprise Edition components (e.g., web pages, Enterprise JavaBeans (EJBs), etc) or legacy networks, and implement media processing functions such as transcoding, media insertion, echo cancellation, modulation/demodulation, and so on.

The SS7 lower layers MTP2 150 and MTP3 160 are specifically adapted for signaling as described in SS7 specifications. The MTP2 150 bean performs functionalities such as delimitation of signal units, alignment of signal units, signaling link error detection, signaling link error correction by retransmission, signaling link initial alignment, error monitoring and reporting, and link flow control as specified in ITU-T specification. The MTP3 160 bean performs functionality such as signaling message handling and signaling network management as defined in the ITU-T specification.

Figure 2:
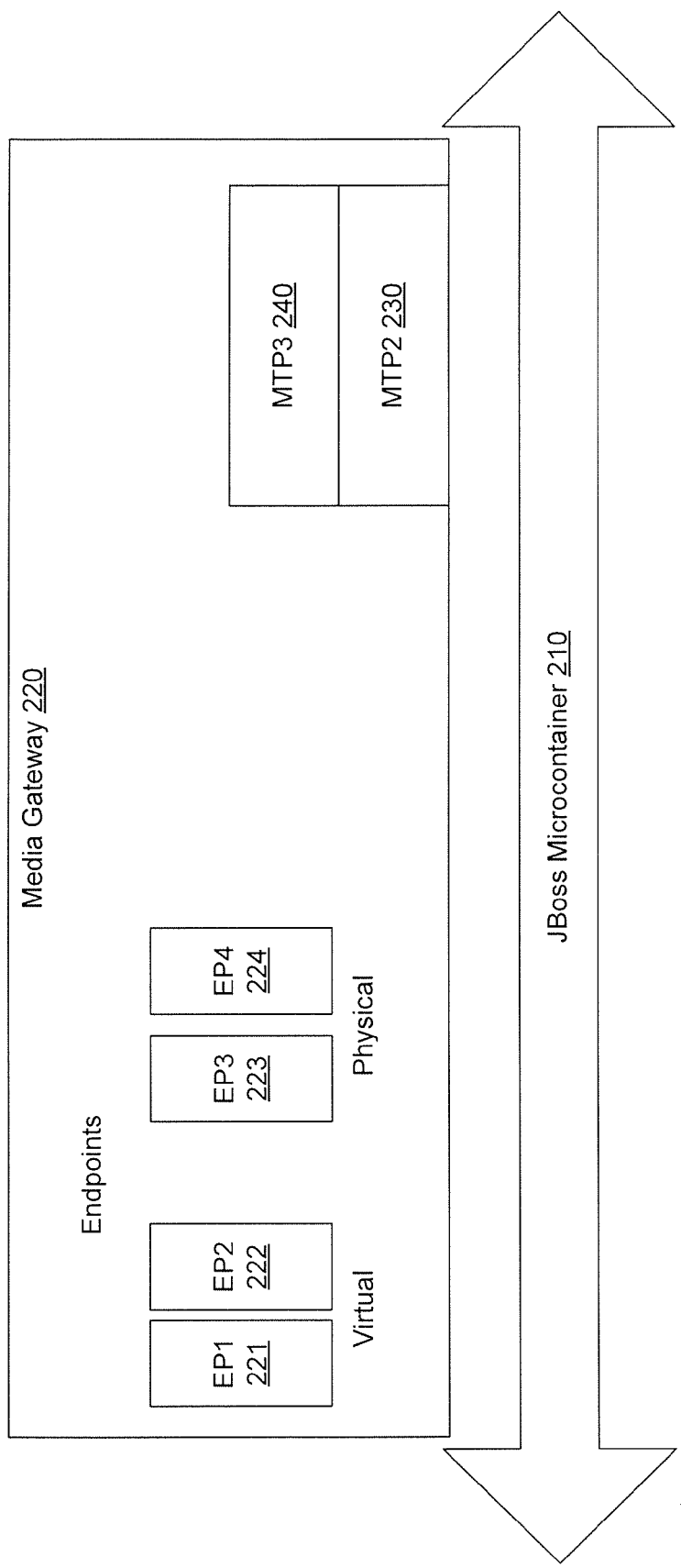
FIG. 2 is a block diagram illustrating endpoints hosted by a media gateway as JBoss Microcontainer beans according to an embodiment of the invention.

FIG. 2 is a block diagram that depicts endpoints 221, 222, 223, 224 hosted by a media gateway 220 as JBoss Microcontainer beans according to an embodiment of the invention. In one embodiment, endpoints 221-224 are the same as endpoints 121-124 described with respect to FIG. 1. The JBoss Microcontainer 210 provides an environment to configure and manage POJOs (plain old java objects). It is designed to reproduce the existing JBoss JMX Microkernel, but targeted at POJO environments. As such, it can be used standalone outside the JBoss Application Server. In one embodiment of the invention, endpoints 221-224 of media gateway 220 may also be implemented as Microcontainer beans, as shown in FIG. 2. Also the SS7 MTP layers may be implemented as Microcontainer beans.

As illustrated in FIG. 2 endpoints 221, 222 are virtual endpoints while endpoints 223, 224 are physical endpoints. In embodiments of the invention, endpoints 221-224 are collocated with SS7 layers MTP2 230 and MTP3 240 Microcontainer Beans. The endpoints 221-224 do not implement signaling logic, but rather are responsible for media generation and handling. The endpoints 221-224 provide voice and video interfaces for JAVA EE components (e.g., web pages, Enterprise JavaBeans (EJBs), etc) or legacy networks, and implement media processing functions such as transcoding, media insertion, echo cancellation, modulation/demodulation, and so on. Endpoints are a source and/or sink of data that may be physical or virtual.

One example of a physical endpoint 223, 224 is an interface to a gateway that terminates a trunk connected to a Public Switch Telephone Network (PSTN) switch. Another example of a physical endpoint 223, 224 is an interface to a gateway that terminates an analog Plain Old Telephone System (POTS) connection to a phone or a PBX, for instance.

An example of a virtual endpoint 221, 222 is an Announcement endpoint that plays an audio file for a user agent (UA) (not shown). Another virtual endpoint is a Packet Relay endpoint, which is a specific form of a conference bridge that usually supports just two connections. A further example of a virtual endpoint 221, 222 is a Conference endpoint, which includes an Audio Mixer and is used for conference applications. Another example virtual endpoint is an Interactive Voice Response (IVR) endpoint that is used for recording, collecting, and generating dual tone multi-frequency (DTMF) signals and other tones. Yet another virtual endpoint 221, 222 may be an Echo endpoint, which generally echoes the audio from a UA and is mostly used for testing the line between a user agent and the media server. With respect to the SS7 MTP2 and MTP3 layers, they are also implemented as endpoints in the media server of embodiments of the invention.

MTP Level 2 (MTP2) 230 provides the Signaling Link functional level for narrowband signaling links. MTP2 230 provides error detection and sequence checking, and retransmits unacknowledged messages. MTP2 230 uses packets called signal units to transmit SS7 messages. There are three types of signal units: Fill-in Signal Unit (FISU), Link Status Signal Unit (LSSU), Message Signal Unit (MSU).

MTP Level 3 (MTP3) 240 provides the Signaling Network functional level for narrowband signaling links and for broadband signaling links. MTP3 240 provides routing functionality to transport signaling messages through the SS7 network to the requested endpoint. Each network element in the SS7 network has a unique address, the Point Code (PC). Message routing is performed according to this address. A distinction is made between a Signaling Transfer Point (STP) which only performs MTP message routing functionalities and a Signaling End Point (SEP) which uses MTP to communicate with other SEPs (that is, telecom switches). MTP3 240 is also responsible for network management; when the availability of MTP2 data links changes, MTP3 240 establishes alternative links as required and propagates information about route availability through the network.

Figure 3:
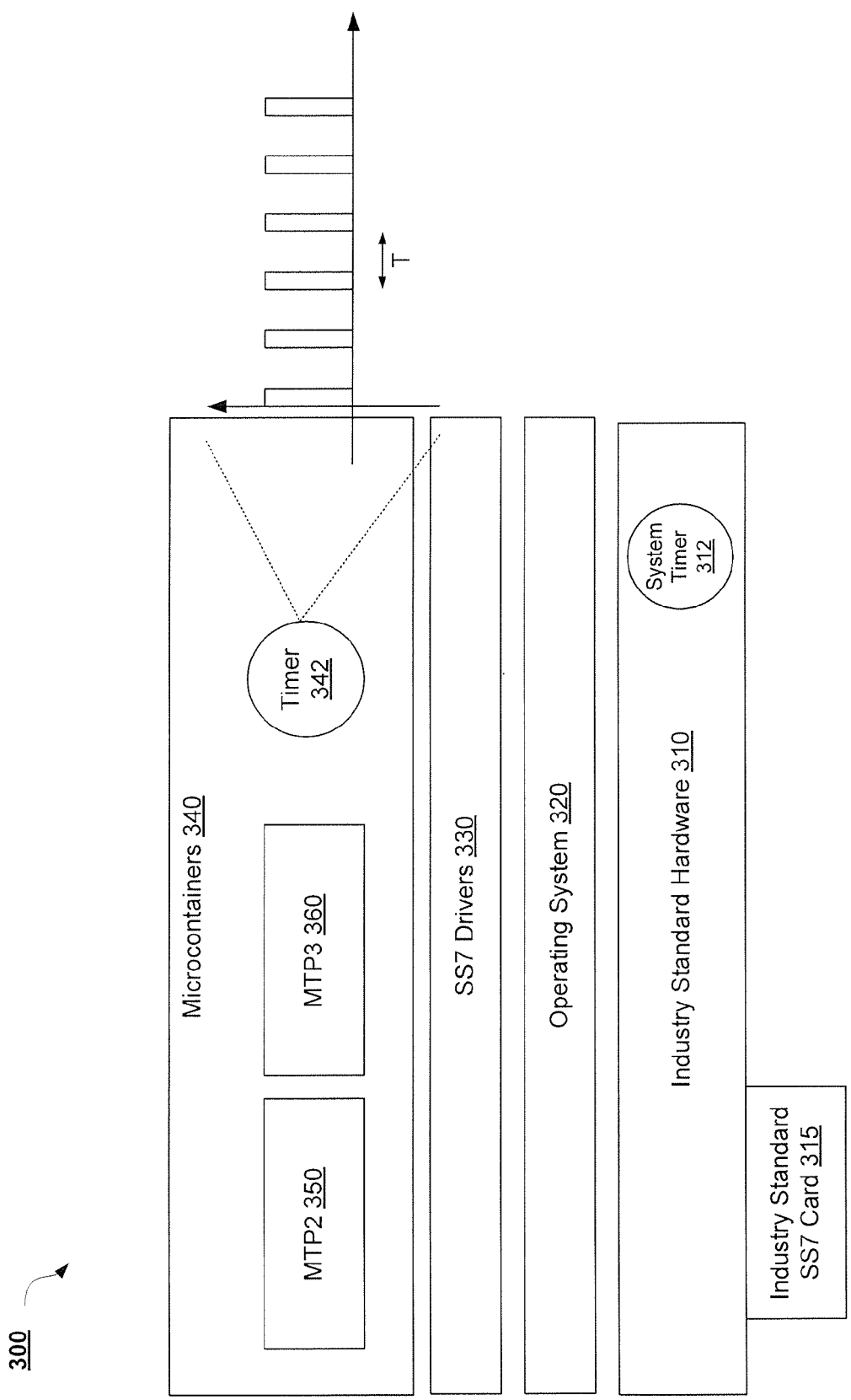
FIG. 3 is a block diagram depicting a System Signaling 7 (SS7) Message Transfer Part (MTP) layer architecture according to an embodiment of the invention.

FIG. 3 is a block diagram depicting an SS7 MTP layer architecture 300 according to an embodiment of the invention. In one embodiment, SS7's MTP2 350 and MTP3 360 layers, implemented as Microcontainer beans, include a timer 342 that generates a sequence of time marks on a regular time basis. In one embodiment, timer 342 is synchronized with system timer 312. Upon each time mark by the timer 342, the MTP implementation 350, 360 makes requests to the underlying hardware or software layers, such as industry standard hardware 310, operating system 320, and SS7 drivers 330 to read a real-time signaling.

Figure 4:
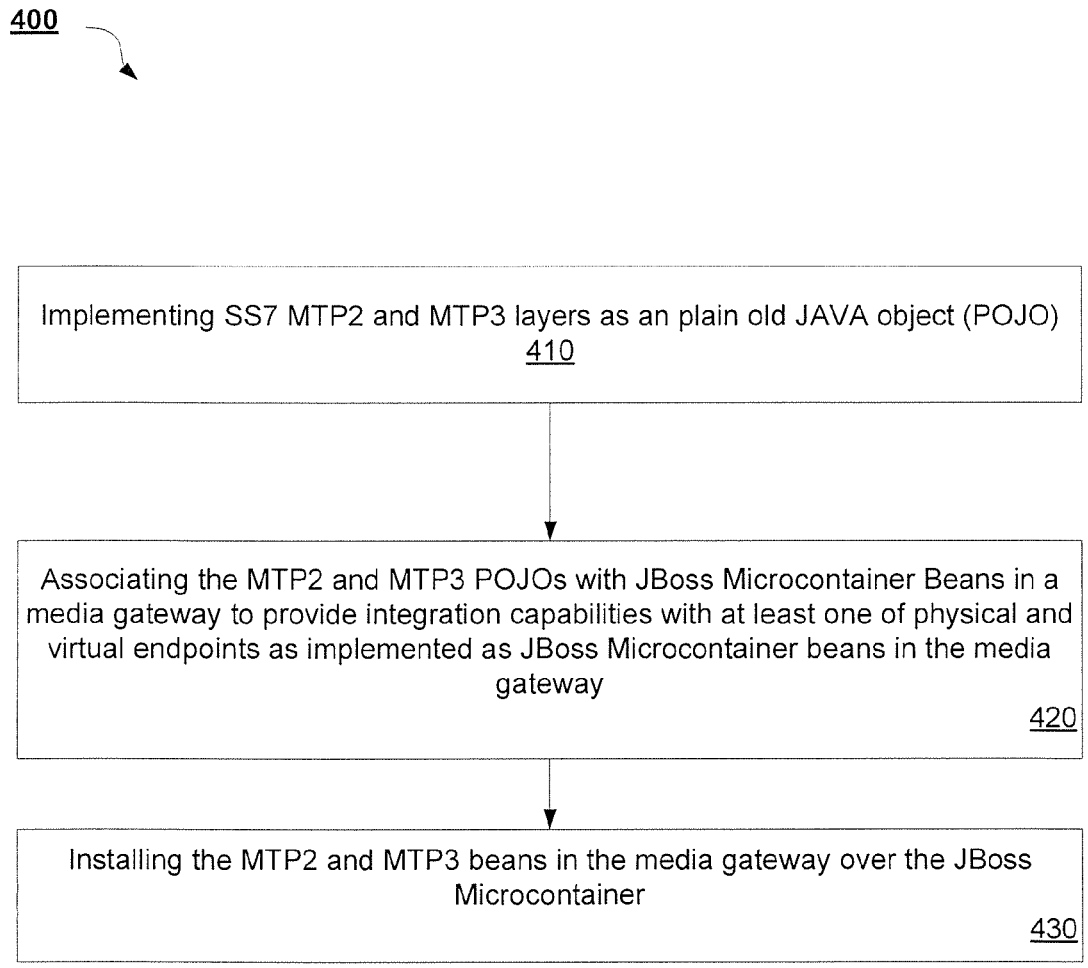
FIG. 4 is a flow diagram illustrating a method for implementation of SS7 layers as microcontainer beans in a media gateway according to an embodiment of the invention.

FIG. 4 is a flow diagram illustrating a method 400 for implementation of SS7 layers as microcontainer beans in a media gateway according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 may be performed by communications platform 100 described with respect to FIG. 1.

Method 400 begins at block 410, where an SS7 layers MTP2 and MTP3 are implemented as simple POJOs. Then, at block 420, a Microcontainer Bean is associated with the SS7's MTP2 and MTP3 implementation object to provide integration capabilities with physical and virtual endpoints, which are also associated with Microcontainer Beans. Lastly, at block 430, all of the Microcontainer Beans are deployed on a JBoss Microcontainer Service.

Figure 5:
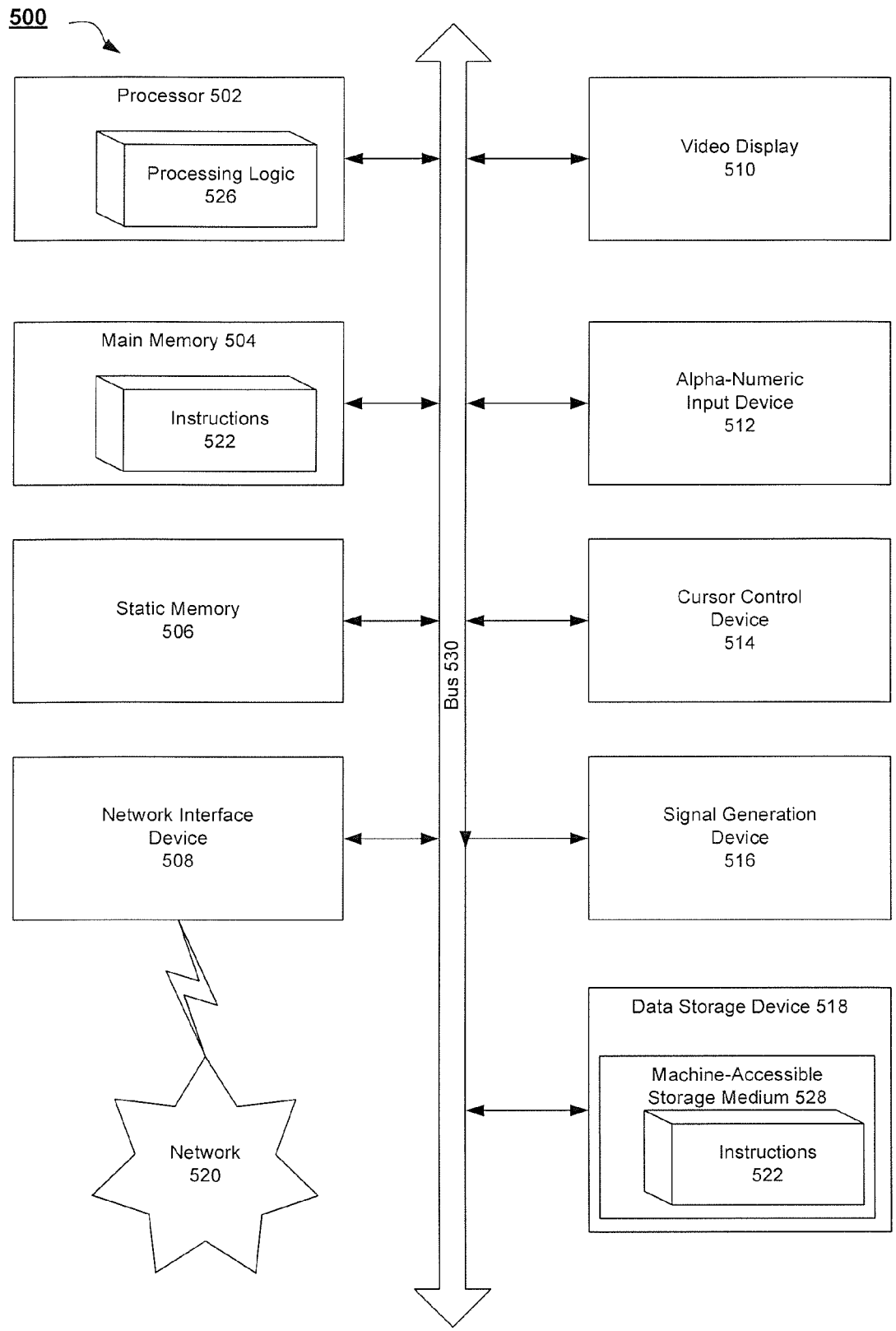
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform implementation of system signaling 7 (SS7) layers as microcontainer beans in a media gateway by communications platform 100 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform method 400 for implementation of system signaling 7 (SS7) layers as microcontainer beans in a media gateway described with respect to FIG. 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
implementing, by a processing device of a communications platform, one or more System Signaling No. 7 (SS7) Message Transfer Part (MTP) layers as plain old JAVA objects (POJOs);
associating, by the processing device, each of the one or more SS7 MTP layers with Jboss™ Microcontainer Beans (beans);
installing, by the processing device, the beans associated with the one or more SS7 MTP layer in a media gateway of the communications platform, wherein each bean installed in the media gateway comprises a timer that generates a sequence of time marks;
sending, by each bean at each of the time marks, a request to the media gateway to generate a portion of media that represents a time interval; and
generating, by the media gateway, the portion of the media in response to the request.

2. The method of claim 1, wherein the one or more SS7 MTP layers are at least one of MTP2 or MTP3.

3. The method of claim 2, wherein the MTP2 and MTP3 layers are specifically adapted for SS7 signaling comprising the MTP2 layer providing functionality comprising delimitation of signal units, alignment of signal units, signaling link error detection, signaling link error correction by retransmission, signaling link initial alignment, error monitoring and reporting, and link flow control, and wherein the MTP3 layer providing functionality comprising signaling message handling and signaling network management.

4. The method of claim 1, wherein the one or more SS7 MTP layer Microcontainer Beans are installed in the media gateway over a JBoss™ Microcontainer implementation.

5. The method of claim 1, wherein associating each of the one or more SS7 MTP layers with JBoss™ Microcontainer Bean provides integration capabilities with one or more physical and virtual endpoints in the media gateway.

6. The method of claim 5, wherein the one or more physical and virtual endpoints comprise at least one of a T1 line endpoint, an E1 line endpoint, a fax line endpoint, a Time Division Multiplexing line endpoint, an Interactive Voice Response (IVR) endpoint, an Announcement endpoint, a Conference endpoint, an Echo endpoint, or a Packet Relay endpoint.

7. The method of claim 5, wherein the one or more endpoints in the media server communicate with one another via one or more local in-virtual machine (VM) pass-by reference semantics.

8. The method of claim 1, wherein the time interval comprises [T*n–T*(n+1)] seconds, where T is period of packetization and n is a number of timer marks in T.

9. A system, comprising:
a processing device;
a memory communicably coupled to the processing device;
a System Signaling 7 (SS7) card communicably coupled to the processing device and the memory;
a media gateway executable from the memory by the processing device, the media gateway configured to utilize the SS7 card; and a JBoss™ Microcontainer executable from the memory by the processing device, and communicably coupled to the media gateway, the JBoss™ Microcontainer configured to:

implement one or more System Signaling No. 7 (SS7) Message Transfer Part (MTP) layers as plain old JAVA objects (POJOs);

associate each of the one or more SS7 MTP layers with JBoss™ Microcontainer Beans (beans);

install the beans associated with the one or more SS7 MTP layer in a media gateway of the communications platform over the JBoss™ Microcontainer;

wherein each bean installed in the media gateway comprises a timer that generates a sequence of time marks, wherein at each time mark the bean sends a request to the media gateway to generate a portion of media that represents a time interval; and the media gateway to generate the portion of the media in response to the request.

10. The system of claim 9, wherein the one or more SS7 MTP layers are at least one of MTP2 or MTP3.

11. The system of claim 10, wherein the MTP2 and MTP3 layers are specifically adapted for SS7 signaling comprising the MTP2 layer providing functionality comprising delimitation of signal units, alignment of signal units, signaling link error detection, signaling link error correction by retransmission, signaling link initial alignment, error monitoring and reporting, and link flow control, and wherein the MTP3 layer providing functionality comprising signaling message handling and signaling network management.

12. The system of claim 9, wherein the JBoss™ Microcontainer implementation reproduces a JBoss JAVA Management Extensions (JMX) Microkernel that is targeted at POJO environments.

13. The system of claim 9, wherein associating each of the one or more SS7 MTP layers with JBoss™ Microcontainer Bean provides integration capabilities with one or more physical and virtual endpoints in the media gateway.

14. The system of claim 13, wherein the one or more physical and virtual endpoints comprise at least one of a T1 line endpoint, an E1 line endpoint, a fax line endpoint, a Time Division Multiplexing line endpoint, an Interactive Voice Response (IVR) endpoint, an Announcement endpoint, a Conference endpoint, an Echo endpoint, or a Packet Relay endpoint.

15. The system of claim 9, wherein the time interval comprises [T*n−T* (n+1)] seconds, where T is period of packetization and n is a number of timer marks in T.

16. A non-transitory machine-readable storage medium including data that, when accessed by a machine, cause the machine to perform operations comprising:

implementing, by a processing device of the machine in a communications platform, one or more System Signaling No. 7 (SS7) Message Transfer Part (MTP) layers as plain old JAVA objects (POJOs);

associating, by the processing device, each of the one or more SS7 MTP layers with JBoss Microcontainer Beans (beans);

installing, by the processing device, the beans associated with the one or more SS7 MTP layer in a media gateway of the communications platform, wherein each bean installed in the media gateway comprises a timer that generates a sequence of time marks;

sending, by each bean at each of the time marks, a request to the media gateway to generate a portion of media that represents a time interval; and generating, by the media gateway, the portion of the media in response to the request.

17. The non-transitory machine-readable storage medium of claim 16, wherein the one or more SS7 MTP layers are at least one of MTP2 or MTP3.

18. The non-transitory machine-readable storage medium of claim 16, wherein the JBoss Microcontainer implementation reproduces a JBoss™ JAVA Management Extensions (JMX) Microkernel that is targeted at POJO environments.

19. The non-transitory machine-readable storage medium of claim 16, wherein associating each of the one or more SS7 MTP layers with JBoss™ Microcontainer Bean provides integration capabilities with one or more physical and virtual endpoints in the media gateway.

20. The non-transitory machine-readable storage medium of claim 16, wherein the time interval comprises [T*n−T* (n+1)] seconds, where T is period of packetization and n is a number of timer marks in T.

* * * * *